(12) United States Patent
Tsukada

(10) Patent No.: US 6,600,707 B2
(45) Date of Patent: Jul. 29, 2003

(54) OPTICAL DISC AND OPTICAL DISC DRIVING DEVICE

(75) Inventor: Futoshi Tsukada, Kanagawa (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 09/814,712

(22) Filed: Mar. 23, 2001

(65) Prior Publication Data

US 2001/0030919 A1 Oct. 18, 2001

(30) Foreign Application Priority Data

Mar. 24, 2000 (JP) .................................. P2000-088598

(51) Int. Cl.[7] ................................................ G11B 7/00
(52) U.S. Cl. ................................ 369/47.22; 369/47.21; 369/275.3; 369/59.23
(58) Field of Search .............................. 369/47.1, 47.15, 369/47.16, 47.21, 47.22, 47.5, 47.53, 53.1, 53.11, 53.44, 59.1, 59.11, 59.19, 59.23, 275.1, 275.3

(56) References Cited

U.S. PATENT DOCUMENTS

| | | |
|---|---|---|
| 5,124,966 A | 6/1992 | Roth et al. |
| 5,465,244 A * | 11/1995 | Kobayashi et al. ........ 369/47.4 |
| 5,856,969 A | 1/1999 | Nishiyama |
| 5,905,709 A * | 5/1999 | Blaukovitsch ........... 369/275.4 |
| 6,069,865 A * | 5/2000 | Imai ....................... 369/275.3 |
| 6,424,615 B1 * | 7/2002 | Ishimura et al. ......... 369/275.3 |

FOREIGN PATENT DOCUMENTS

| | | |
|---|---|---|
| EP | 0 292 917 | 11/1988 |
| EP | 0 325 330 | 7/1989 |
| EP | 0 390 268 | 10/1990 |
| EP | 0 642 122 | 3/1995 |

* cited by examiner

*Primary Examiner*—Muhammad Edun
(74) *Attorney, Agent, or Firm*—Oblon, Spivak, McClelland, Maier & Neustadt, P.C.

(57) ABSTRACT

An optical disc having a data area in which information signals are recorded, a lead-in area and a lead-out area provided before and after the data area, and a program memory area for temporarily storing address information necessary for additionally writing information signals. A subcode Q of the lead-in area or a subcode Q of the program memory area is provided with identification information for identifying these subcodes Q. For example, the identification information is provided at least in one of address (ADR), track number (TNO), and zero (ZERO) constituting the subcode Q of the program memory area or the lead-in area. Thus, it is possible to discriminate the subcode Q of the program memory area and the subcode Q of the lead-in area securely and instantaneously.

19 Claims, 5 Drawing Sheets

 FIG.5A (ATIP WOBBLE SIGNAL)
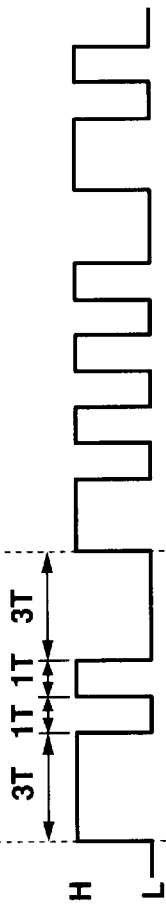 FIG.5B (CHANNEL BIT PATTERN)
FIG.5C (BIPHASIC SIGNAL)
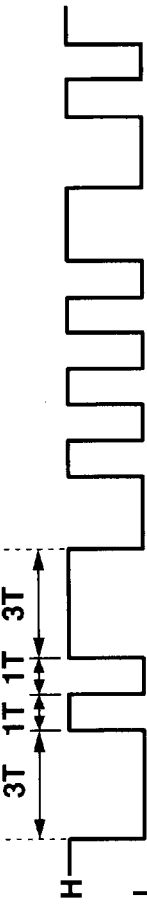 FIG.5D (CHANNEL BIT PATTERN)
 FIG.5E (BIPHASIC SIGNAL)

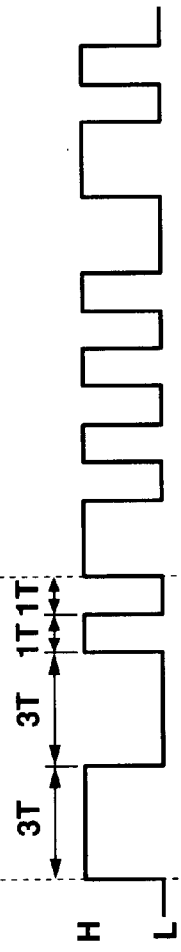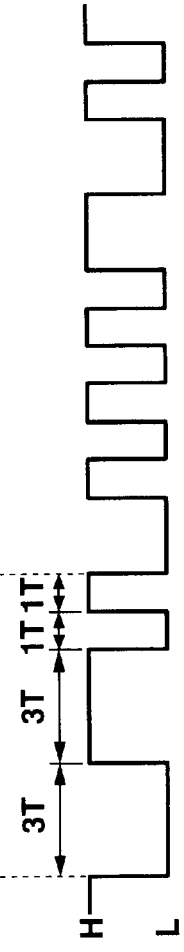
FIG.6A (ATIP WOBBLE SIGNAL)
FIG.6B (CHANNEL BIT PATTERN)
FIG.6C (BIPHASIC SIGNAL)
FIG.6D (CHANNEL BIT PATTERN)
FIG.6E (BIPHASIC SIGNAL)

OPTICAL DISC AND OPTICAL DISC DRIVING DEVICE

BACKGROUND OF THE INVENTION

1. Field of the Invention

This invention relates to an optical disc which enables recording of information such as a so-called CD-R or CD-RW, and also relates to an optical disc driving device.

2. Description of the Related Art

An optical disc is a disc-shaped recording medium having a signal recording layer such that recording and/or reproduction (hereinafter referred to as recording/reproduction) of information signals is carried out by casting a light beam onto the signal recording layer.

As such optical discs, reproduction-only optical discs such that pit arrays corresponding to information signals to be recorded are formed in advance on disc substrates, like CDs (compact discs) or CD-ROMs (CD-read only memories), have been popularly used. In such a reproduction-only optical disc, the major surface of the disc substrate on which pit arrays are formed has the function of the signal recording layer.

In the field of optical discs, additional writing and rewriting of information signals are strongly demanded. In such circumstances, for example, an optical disc which is used in a so-called compact disc recordable system and enables additional writing of information signals (hereinafter referred to as CD-R) is practically used. The signal recording layer of the CD-R on which information signals are recorded is made of an organic pigment-based material. By irradiating the signal recording layer with a light beam, the reflectance is changed at the irradiation position so as to carry out recording and the reflectance of the signal recording layer is detected to carry out reproduction of recorded signals.

As a recordable optical disc, a phase-changing optical disc like a CD-RW (CD-rewritable) which enables rewriting of recording signals by utilizing a phase change of the signal recording layer is practically used.

The above-described CD-R and CD-RW employ recording systems such as so-called disk at once, track at once, packet writing, and multi-session systems. In such cases, it is necessary to provide a program memory area (PMA) for temporarily storing address information necessary for continuous writing, in addition to a lead-in area and a lead-out area.

With such optical discs having a program memory area, it is demanded to securely discriminate the PMA and the lead-in area and carry out accurate reading operation. However, with the conventional CD-R and CD-RW, it is difficult to discriminate the subcode Q of the PMA and the subcode Q of the lead-in area on the basis of the data thereof.

Therefore, with these optical discs, identification between the PMA and the lead-in area is dependent solely on an ATIP (absolute time in pregroove) wobble signal. Therefore, there may be some inconvenience like malfunction and a long time required for discrimination.

SUMMARY OF THE INVENTION

In view of the foregoing status of the art, it is an object of the present invention to provide an optical disc which enables secure and instantaneous discrimination between the subcode Q of the PMA and the subcode Q of the lead-in area and which enables accurate reading of information in a short period of time, and to provide an optical disc driving device.

An optical disc according to the present invention comprises a data area in which information signals are recorded, a lead-in area and a lead-out area provided before and after the data area, and a program memory area for temporarily storing address information necessary for additionally writing information signals, wherein a subcode Q of the lead-in area and/or a subcode Q of the program memory area is provided with identification information for identifying the subcodes.

Also, an optical disc according to the present invention comprises a data area in which a wobbled track groove is formed and information signals are recorded, a lead-in area and a lead-out area provided before and after the data area, and a program memory area provided on the inner side than the lead-in area and adapted for temporarily storing address information necessary for additionally writing information signals, wherein a subcode Q of the lead-in area and/or a subcode Q of the program memory area is provided with identification information for identifying the subcodes.

An optical disc driving device according to the present invention is adapted for carrying out recording and/or reproduction of information signals by casting a light beam onto an optical disc comprising a data area in which information signals are recorded, a lead-in area and a lead-out area provided before and after the data area, and a program memory area for temporarily storing address information necessary for additionally writing information signals. The device comprises a data processing section for processing data obtained from a reflected light from the optical disc, wherein a subcode Q of the lead-in area and a subcode Q of the program memory area are discriminated on the basis of identification information provided for the subcode Q of the lead-in area and/or the subcode Q of the program memory area.

BRIEF DESCRIPTION OF THE DRAWINGS

FIG. 2A shows the layout of the recording area of the normal-density CD-R. FIG. 2B shows the layout of the recording area of the double-density CD-R.

FIGS. 5A to 5E show a specific example of the pattern of a synchronizing signal "SYNC" of an ATIP wobble signal on the normal-density CD-R. FIG. 5A shows the ATIP wobble signal. FIG. 5B shows a channel bit pattern in the case where the channel bit immediately before is "0". FIG. 5C shows a biphasic signal corresponding to the channel bit pattern of FIG. 5B. FIG. 5D shows a channel bit pattern in the case where the channel bit immediately before is "1". FIG. 5E shows a biphasic signal corresponding to the channel bit pattern of FIG. 5D.

FIGS. 6A to 6E show a specific example of the pattern of a synchronizing signal "SYNC" of an ATIP wobble signal on the double-density CD-R. FIG. 6A shows the ATIP wobble signal. FIG. 6B shows a channel bit pattern in the case where the channel bit immediately before is "0". FIG. 6C shows a biphasic signal corresponding to the channel bit pattern of FIG. 6B. FIG. 6D shows a channel bit pattern in the case where the channel bit immediately before is "1". FIG. 6E shows a biphasic signal corresponding to the channel bit pattern of FIG. 6D.

DESCRIPTION OF THE PREFERRED EMBODIMENTS

The structure of an optical disc according to the present invention and an optical disc driving device will now be described in detail with reference to the drawings.

First, prior to specific explanation of the optical disc and the optical disc driving device according to the present invention, a CD-R of the existing format (hereinafter referred to as normal-density CD-R) and a double-density CD-R that is newly defined will be described, as examples of the optical disc according to the present invention. In the following description, discrimination is not particularly made and a general term of CD-R is used with respect to common parts of the normal-density CD-R and the double-density CD-R.

Various specifications of the CD-R are standardized by the name of so-called Orange Book Part II. Therefore, only the basic structure and different parts of the existing CD-R (normal-density CD-R) and the double-density CD-R are described here.

Figure 1:
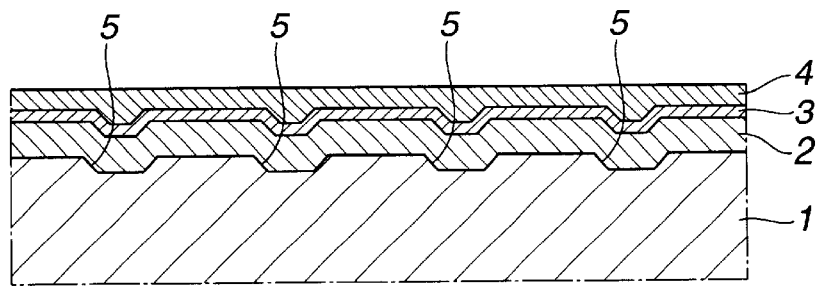
FIG. 1 is a cross-sectional view showing essential portions of a CD-R.

The CD-R has a disc substrate 1 which is formed by molding a resin material such as polymethyl methacrylate (PMMA) or polycarbonate (PC) into a disc shape with an outer diameter of 120 mm and a thickness of 1.2 mm, and a recording layer 2 which is formed on the disc substrate 1 by spin coating with an organic pigment-based recording material, as shown in FIG. 1. A reflection film 3 is formed on the recording layer 2 by depositing gold (Au), silver (Ag) or the like, and a protection layer 4 is formed on the reflection film 3 by spin coating with an ultraviolet-setting resin or the like.

In this CD-R, as a laser beam for recording which is modulated in accordance with data to be written (hereinafter referred to as recording data) is cast onto the recording layer 2, an interaction between the portion of the recording layer 2 irradiated with the laser beam and the disc substrate 1 in contact with the recording layer 2 causes deformation on the interface between the recording layer 2 and the disc substrate 1, thus irreversibly forming a pit array corresponding to the recording data. As a laser beam for reproduction is cast onto the pit array and a change in the reflectance is detected, the data written on the CD-R is read out.

Meanwhile, it is prescribed in the so-called Red Book that the thickness of the disc substrate 1 of the normal-density CD-R should be within a range of 1.20±0.1 mm. The tolerance as large as ±0.1 mm is permitted in the thickness of the disc substrate 1 in consideration of the manufacturing technique for the disc substrate at the time when the Red Book prescription was made. At present, since the manufacturing technique for the disc substrate has been more advanced, it is possible to manufacture the disc substrate at a high yield without permitting such a large tolerance.

With respect to the tolerance in the thickness of the disc substrate 1 of the double-density CD-R, it is desired to set the tolerance in the plus direction as small as possible. If the disc substrate 1 has a large thickness, a large coma is generated when a skew, which is a deviation between the optical axis and the disc surface, is generated. Therefore, the S/N ratio of signals is deteriorated because of the influence of cross talk between adjacent tracks and inter-symbol interference in the direction along the recording tracks. Particularly, since the double-density CD-R has a narrower track pitch and a higher linear density than the normal-density CD-R, it is demanded to restrain the influence of the coma to the minimum level. Moreover, if the disc substrate 1 has a large thickness, it is more likely to be affected by dust and particles adhered to the disc substrate 1. Therefore, with respect to the double-density CD-R, it is desired to set the tolerance in the plus direction in the thickness of the disc substrate 1 as small as possible.

In consideration of the foregoing points, the tolerance in the thickness of the disc substrate 1 of the double-density CD-R is set at 0.02 mm in the plus direction and −0.1 mm in the minus direction. That is, the thickness of the disc substrate 1 of the double-density CD-R is set within a range of 1.10 to 1.22 mm.

Figure 2A:
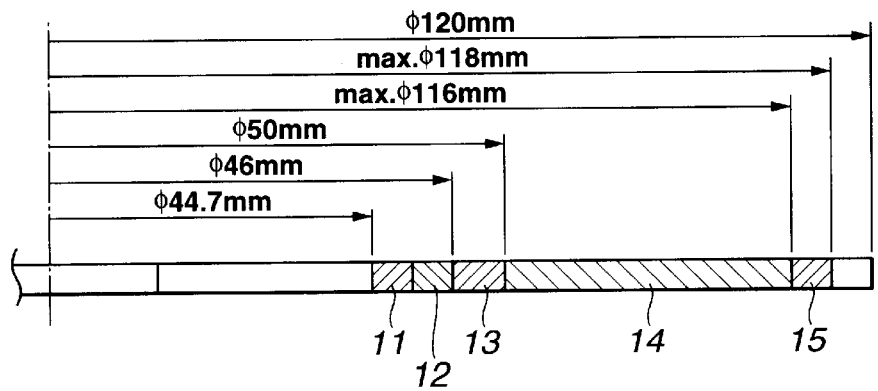
FIGS. 2A and 2B show the layout of the recording area of the CD-R.
Figure 2B:
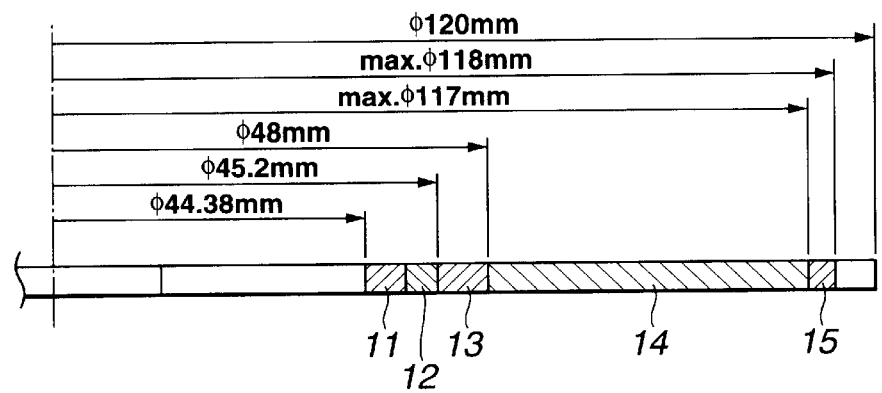

The layout of the recording area of the CD-R is shown in FIGS. 2A and 2B. As shown in FIGS. 2A and 2B, from the inner circle of the CD-R, a PCA (power calibration area) 11, a PMA (program memory area) 12, a lead-in area 13, a program area 14, and a lead-out area 15 are provided on the CD-R in this order.

The PCA 11 is an area for calibrating the laser power at the time of recording and has a test area for actually carrying out test writing and a count area for recording the state of use of the test area. The PMA 12 is an area for temporarily storing information such as the mode of data to be written, the recording start position, the recording end position and the like by each track. The PCA 11 and the PMA 12 are areas that are necessary only at the time of recording. As finalization is carried out to end writing to the lead-in area 13 and the lead-out area 15, the optical pickup does not access the PCA 11 and the PMA 12 at the time of reproduction.

The lead-in area 13 is an area used for reading out data written in the program area 14 and TOC (table of contents) information or the like is recorded therein. At the time of reproduction, by reading the TOC information recorded in the lead-in area 13, the optical pickup can instantaneously access a desired track.

The program area 14 is an area in which recording data is actually written and 99 logical tracks at the maximum are set therein.

The lead-out area 15 is an area in which various types of information related to the disc is recorded. The lead-out area 15 also serves as a buffer area for preventing the optical pickup of the optical disc device from overrunning.

In the normal-density CD-R, the lead-in area 13 is set in an area of ϕ46 mm to ϕ50 mm, the program area 14 is set in an area of ϕ50 mm to ϕ116 mm at the maximum, and the lead-out area 15 is set in an area of ϕ116 mm to ϕ118 mm at the maximum, as shown in FIG. 2A. On the inner side than the lead-in area 13, the PCA 11 and the PMA 12 are provided. The innermost circle of the PCA 11 is in an area of ϕ44.7 mm.

On the other hand, in the double-density CD-R, the lead-in area 13 is set in an area of ϕ45.2 mm to ϕ48 mm, the program area 14 is set in an area of ϕ48 mm to ϕ117 mm at the maximum, and the lead-out area 15 is set in an area of ϕ117 mm to ϕ118 mm at the maximum, as shown in FIG. 2B. On the inner side than the lead-in area 13, the PCA 11 and the PMA 12 are provided. The innermost circle of the PCA 11 is in an area of ϕ44.38 mm.

The layout of the double-density CD-R as described above is set for the purpose of expanding the program area 14 to the maximum while maintaining the compatibility with the normal-density CD-R. That is, in the double-density CD-R, increase in the recording capacity is realized not only by increasing the recording density but also by expanding the program area 14 in which recording data is actually written, to such an extent that the compatibility with the normal-density CD-R is maintained.

Figure 3:
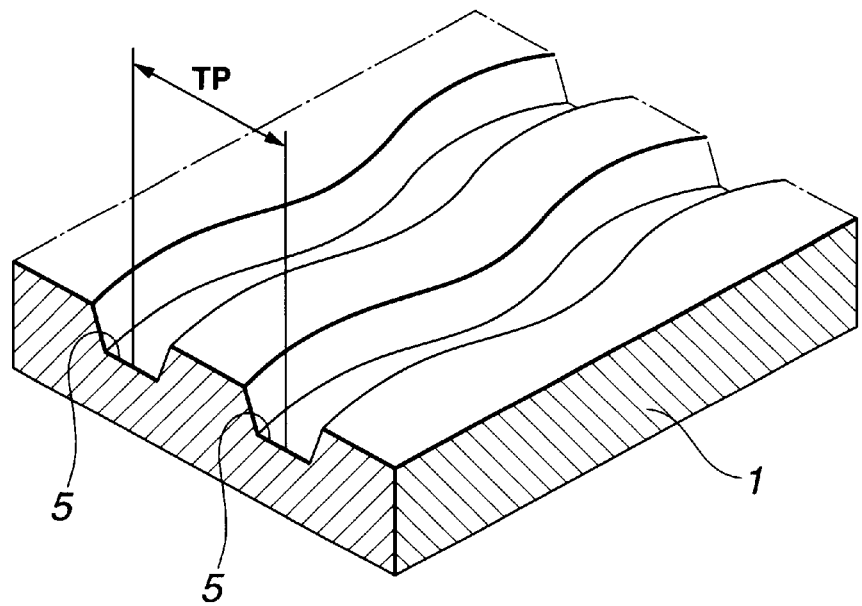
FIG. 3 is an enlarged perspective view showing a portion of a disc substrate of the CD-R.

On the disc substrate 1 of the CD-R, a wobbling groove 5 as a wobbling guide groove is formed, for example, in a spiral shape, as shown in FIGS. 1 and 3. The portion of the recording layer 2 corresponding to the wobbling groove 5 is set as a recording track and an EFM-modulated signal (EFM signal) is recorded onto this recording track. That is, in the CD-R, the spacing between adjacent wobbling grooves 5 represents the track pitch TP, as shown in FIG. 3. In the normal-density CD-R, the track pitch TP is set within a range of 1.6±0.02 µm, and in the double-density CD-R, the track pitch TP is set within a range of 1.1±0.02 µm. In the double-density CD-R, a higher recording density is realized by thus narrowing the track pitch TP than in the normal-density CD-R.

In the double-density CD-R, at the same time as the track pitch TP is narrowed, the recording density (linear density) in the direction along the recording tracks is increased. Specifically, for example, the minimum pit length (3T) in the double-density CD-R is approximately 0.62 µm, whereas the minimum pit length (3T) in the normal-density CD-R is approximately 0.83 µm.

As described above, by narrowing the track pitch TP and increasing the linear density, the double-density CD-R has a recording density that is approximately twice the recording density of the normal-density CD-R, and is capable of recording data of a capacity that is approximately twice that of the normal-density CD-R, specifically, data of 1 GB or more.

The track pitch TP in these CD-Rs can be set at an appropriate value by adjusting the feed quantity in forming a latent image corresponding to the wobbling groove 5 onto a resist layer on a glass substrate, that is, the feed quantity in the radial direction of the glass substrate for each turn of the glass substrate, in a process of preparing a master disc for the disc substrate 1. Specifically, by setting the feed quantity in the radial direction of the glass substrate within a range of 1.6±0.02 µm every time the glass substrate makes one turn in the master disc preparation process, the normal-density CD-R having the track pitch TP set within the range of 1.6±0.02 µm can be provided. On the other hand, by setting the feed quantity in the radial direction of the glass substrate within a range of 1.1±0.02 µm every time the glass substrate makes one turn in the master disc preparation process, the double-density CD-R having the track pitch TP set within the range of 1.1±0.02 µm can be provided.

A change in the linear density of these CD-Rs can be realized by setting the linear velocity in rotating these CD-Rs at an appropriate value. Specifically, the linear velocity in rotating the normal-density CD-R is set within a range of 1.2±0.02 m/sec and the linear velocity in rotating the double-density CD-R is set within a range of 0.9±0.02 m/sec.

In the CD-R, the wobbling groove 5 is formed to slightly wobble in the shape of sine waves. By this wobbling, FM-modulated position information, that is, time base information indicating the absolute position on the disc, is recorded as an ATIP (absolute time in pregroove) wobble signal.

The ATIP wobble signal is recorded so that the center frequency is, for example, 22.05 kHz when the CD-R is rotated at a predetermined velocity. One sector of the ATIP wobble signal is coincident with a one-data sector (2352 bytes) of the recording data. In the case of writing the recording data, the data sector of the recording data is synchronized with the sector of the ATIP wobble signal.

Figure 4:
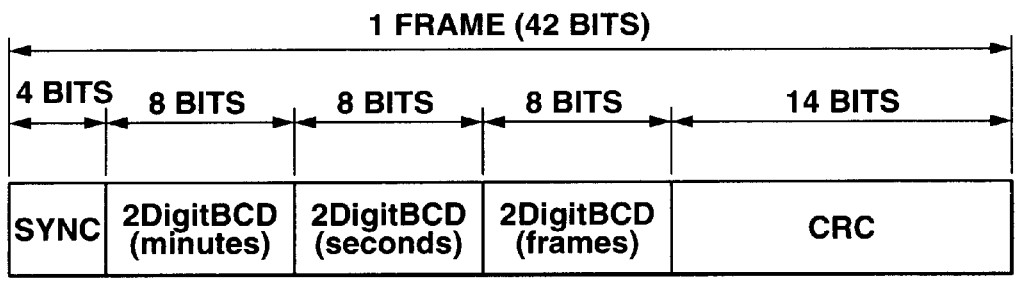
FIG. 4 shows the frame structure of an ATIP wobble signal.

The frame structure of the ATIP wobble signal is shown in FIG. 4. One frame of the ATIP wobble signal consists of 42 bits. The first 4 bits represent a synchronizing signal "SYNC". Subsequently, time base information "minutes", "seconds" and "frames" are provided, each being represented by 2DigitBCD (8 bits). Moreover, a CRC (cyclic redundancy code) of 14 bits is added, thus constituting one frame. The synchronizing signal "SYNC" of the ATIP wobble signal is made different between the normal-density CD-R and the double-density CD-R.

A specific example of the pattern of the synchronizing signal "SYNC" of the ATIP wobble signal in the case of the normal-density CD-R is shown in FIGS. 5A to 5E.

The ATIP wobble signal shown in FIG. 5A is modulated by biphasic mark modulation, thereby having a channel bit pattern as shown in FIG. 5B or FIG. 5D. When the channel bit immediately before is "0", the synchronizing signal "SYNC" of the ATIP wobble signal has a channel bit pattern of "11101000" as shown in FIG. 5B and the biphasic signal after biphasic mark modulation has a waveform as shown in FIG. 5C. When channel bit immediately before is "1", the synchronizing signal "SYNC" of the ATIP wobble signal has a channel bit pattern of "00010111" as shown in FIG. 5D and the biphasic signal after biphasic mark modulation has a waveform as shown in FIG. 5E. That is, the pattern of the synchronizing signal "SYNC" of the ATIP wobble signal in the case of the normal-density CD-R is such that a 3T waveform and a 3T waveform of the reverse polarity are connected with a 1T waveform between them.

On the other hand, a specific example of the pattern of the synchronizing signal "SYNC" of the ATIP wobble signal in the case of the double-density CD-R is shown in FIGS. 6A to 6E.

The ATIP wobble signal shown in FIG. 6A is modulated by biphasic mark modulation, thereby having a channel bit pattern as shown in FIG. 6B or FIG. 6D. When the channel bit immediately before is "0", the synchronizing signal "SYNC" of the ATIP wobble signal has a channel bit pattern of "11100010" as shown in FIG. 6B and the biphasic signal after biphasic mark modulation has a waveform as shown in FIG. 6C. When channel bit immediately before is "1", the synchronizing signal "SYNC" of the ATIP wobble signal has a channel bit pattern of "00011101" as shown in FIG. 6D and the biphasic signal after biphasic mark modulation has a waveform as shown in FIG. 6E. That is, the pattern of the synchronizing signal "SYNC" of the ATIP wobble signal in the case of the double-density CD-R is such that a 3T waveform and a 3T waveform of the reverse polarity are continuous each other.

As described above, since the pattern of the synchronizing signal "SYNC" of the ATIP wobble signal is made different between the normal-density CD-R and the double-density CD-R, when the ATIP wobble signal is detected and its synchronizing signal is read out, whether the loaded CD-R is the normal-density CD-R or the double-density CD-R can be instantaneously determined.

In the above-described CD-R and CD-RW or the like, conventionally, the subcodes Q of the PMA and the lead-in area are written in data formats as shown in Table 1.

In this case, a control area (CRT) in which a code used for identification with respect to the type of information of recording data is recorded is arranged at the leading end, and there are arranged an address area (ADR), a track number area (TNO), a point area (POINT), an absolute time area consisting of minute (MIN), second (SEC) and frame (FRM), a zero data area (ZERO), an absolute time area consisting of minute (PMIN), second (PSEC) and frame (PFRM), and an error detection area (CRC) in which a cyclic redundancy check code for error detection is recorded.

TABLE 1

| CTR | ADR | TNO | POINT | MIN | SEC | FRM | ZERO | PMIN | PSEC | PFRM | CRC |
|-----|-----|-----|-------|-----|-----|-----|------|------|------|------|-----|
| | | | | | (Subcode Q, PMA) | | | | | | |
| 1 | | 00 | 01–99 | Absolute Time When Each Track Starts | | | 00–09 | Absolute Time When Each Track Ends | | | |
| 2 | | 00 | 00 | Disc Identification | | | 00–09 | 00 | 00/10/20 | 00 | |
| | | | | | (Subcode Q, Lead-in) | | | | | | |
| | | 00 | 01–99 | Absolute Time | | | 00 | Absolute Time When Each Track Ends | | | |
| | | 00 | A0 | Absolute Time | | | 00 | First TNO | 00 | 00 | |
| | | 00 | A1 | Absolute Time | | | 00 | First TNO | 00 | 00 | |
| | | 00 | A2 | Absolute Time | | | 00 | Absolute Time When Lead-Out Starts | | | |

The PMA is an area in which address information necessary for continuous writing is temporarily stored, and the lead-in area is an area in which TNO information at the time when finalization is carried out is written.

Therefore, important information that is to be read out first is written in these areas.

However, as is clear from Table 1, it is difficult to discriminate these areas on the basis of the data alone. Particularly, discrimination cannot be made in the case of ZERO=00, and conventionally, discrimination is made by finding several frames that are repeatedly written. That is, using the count function of ZERO, whether the area is the PMA or not is discriminated.

This is a serious disturbance to the improvement in the rise speed.

Thus, in the present invention, identification information for clearly identifying the subcode Q of the PMA and the subcode Q of the lead-in area is provided in one or both of these subcodes Q, as shown in Table 2.

Specifically, in the example shown in Table 2, TNO=FF of the PMA is clearly discriminated from TNO=00 of the lead-in area.

Meanwhile, also in the case of a blank CD-RW from which information has been completely erased, the PMA and the lead-in area can be securely discriminated by setting TNO=FF in the PMA and TNO=00 in the lead-in area.

Although the identification information is entered in TNO in the above-described example, the identification information can also be entered in the other areas of the subcode Q.

For example, since it is prescribed that only a numerical value of 00 to 09 can be entered in the ZERO area of the PMA, the ZERO area of the lead-in area can be clearly discriminated from the ZERO area of the PMA by entering a fixed value selected from 10 to FF into the ZERO area of the lead-in area.

Alternatively, it is possible to enter a numerical value of 7 or greater in ADR of the lead-in area, as the identification information. Since only a numerical value of 1 to 6 can be entered in ADR of the PMA, the PMA and the lead-in area can be clearly discriminated by entering a numerical value of 7 or greater in ADR of the lead-in area.

TABLE 2

| CTR | ADR | TNO | POINT | MIN | SEC | FRM | ZERO | PMIN | PSEC | PFRM | CRC |
|-----|-----|-----|-------|-----|-----|-----|------|------|------|------|-----|
| | | | | | (Subcode Q, PMA) | | | | | | |
| 1 | | FF | 01–99 | Absolute Time When Each Track Starts | | | 00–09 | Absolute Time When Each Track Ends | | | |
| 2 | | FF | 00 | Disc Identification | | | 00–09 | 00 | 00/10/20 | 00 | |
| | | | | | (Subcode Q, Lead-in) | | | | | | |
| | | 00 | 01–99 | Absolute Time | | | 00 | Absolute Time When Each Track Ends | | | |
| | | 00 | A0 | Absolute Time | | | 00 | First TNO | 00 | 00 | |
| | | 00 | A1 | Absolute Time | | | 00 | First TNO | 00 | 00 | |
| | | 00 | A2 | Absolute Time | | | 00 | Absolute Time When Lead-Out Starts | | | |

The identification information can be similarly provided to the subcodes Q of the PMA and the lead-in area of the double-density CD-R.

In the double-density CD-R, a HOUR area and a PHOUR area are provided in the subcodes Q of the PMA and the lead-in area because of its longer recording time. In this case, too, if TNO=FF of the PMA is set, it can be clearly discriminated from TNO=00 of the lead-in area. Also, the other techniques of entering the identification information described above can be similarly applied to this case.

splitter 26, and becomes incident on the objective lens 27. As the numerical aperture NA of the objective lens 27 is set within a range of 0.5±0.01 or a range of 0.55±0.01, the objective lens 27 converges the light beam with the power corresponding to the numerical aperture. Then, the light beam converged by the objective lens 27 is cast onto the CD-R rotated by the spindle motor 21, thus forming beam spots along a pit array corresponding to the recording data.

The light beam cast on the CD-R is reflected by this CD-R. In this case, the reflectance differs depending on the

TABLE 3

| CTR | ADR | TNO | POINT | MIN | SEC | FRM | HOUR | P HOUR | PMIN | PSEC | PFRM | CRC |
|-----|-----|-----|-------|-----|-----|-----|------|--------|------|------|------|-----|
|     |     |     | (Subcode Q, PMA) |  |  |  |  |  |  |  |  |  |
| 1 | FF | 01–99 | Absolute Time When Each Track Starts | | | | Absolute Time When Each Track Ends | | | | | |
| 2 | FF | 00 | Disc Identification | | | | 0 | 00 | 00/10/20 | 00 | | |
|     |     |     | (Subcode Q, Lead-in) |  |  |  |  |  |  |  |  |  |
|   | 00 | 01–99 | Absolute Time | | | | Absolute Time When Each Track Ends | | | | | |
|   | 00 | A0 | Absolute Time | | | | 0 | First TNO | 00 | 00 | | |
|   | 00 | A1 | Absolute Time | | | | 0 | First TNO | 00 | 00 | | |
|   | 00 | A2 | Absolute Time | | | | Absolute Time When Lead-Out Starts | | | | | |

A method for recording information to the above-described CD-R will now be described.

Figure 7:
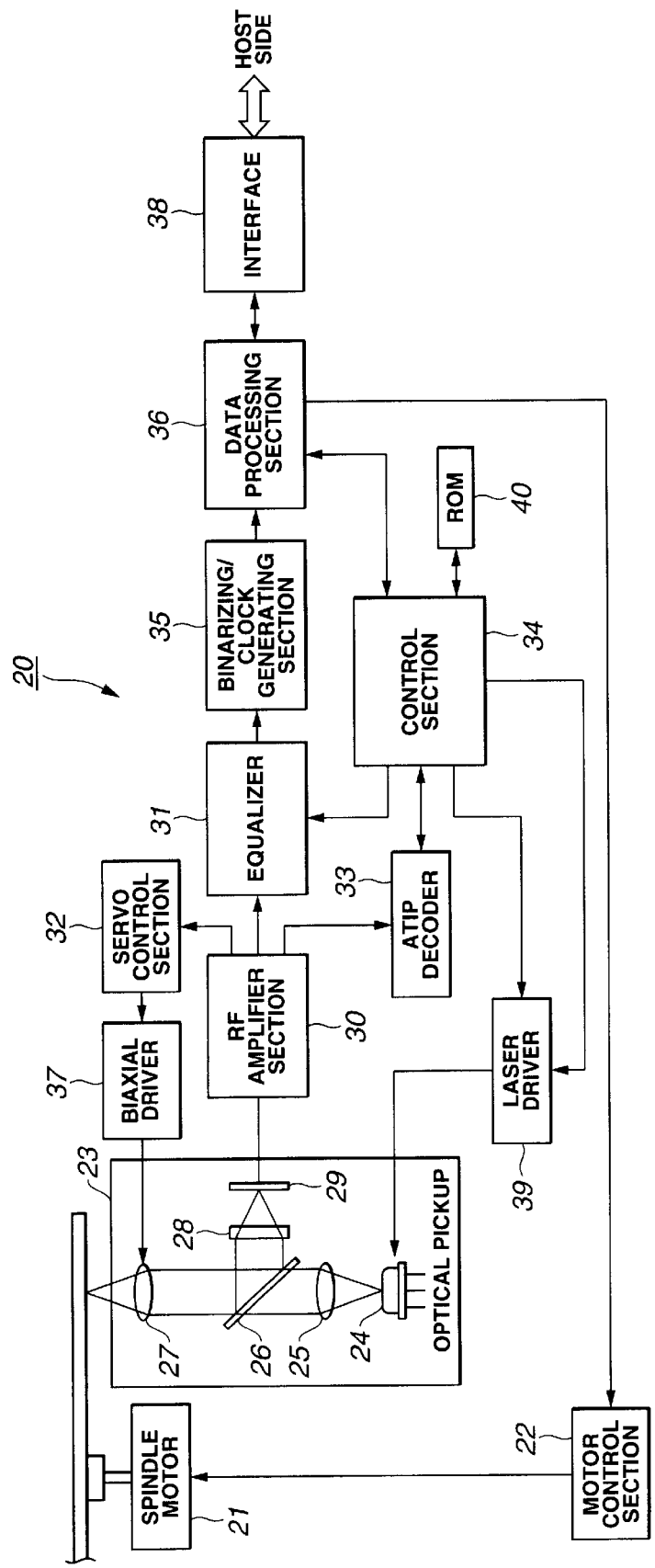
FIG. 7 is a block diagram showing an exemplary structure of an optical disc device.

FIG. 7 shows an exemplary structure of an optical disc device for carrying out recording/reproduction of information signals to/from the CD-R.

An optical disc device 20 shown in FIG. 7 has a spindle motor 21 so that a CD-R (normal-density CD-R or double-density CD-R) as a recording medium is loaded on the spindle motor 21.

The spindle motor 21 is controlled in driving by a motor control section 22. In the case where the normal-density CD-R is loaded, the spindle motor 21 rotates the normal-density CD-R at a CLV (constant linear velocity) within a range of 1.2±0.02 m/sec. In the case where the double-density CD-R is loaded, the spindle motor 21 rotates the double-density CD-R at a CLV within a range of 0.9±0.02 m/sec.

The optical disc device 20 also has an optical pickup 23 for casting a converged light beam onto the CD-R rotated by the spindle motor 21 and detecting a return light reflected by the CD-R. The optical pickup 23 has a semiconductor laser 24 for emitting a light beam with a wavelength of 780 nm, a collimating lens 25 for converting the light beam emitted from the semiconductor laser 24 to a collimated light, a beam splitter 26 for splitting the optical path of the light beam, an objective lens 27 having its numerical aperture NA set within a range of 0.5±0.01 or a range of 0.55±0.01 and adapted for converging the light transmitted through the beam splitter 26 and casting the converged light onto the CD-R, a condenser lens 28 for condensing a return light reflected by the CD-R and reflected by the beam splitter 26, and a photodetector 29 for receiving the return light condensed by the condenser lens 28.

In reproduction, a light beam with a wavelength of 780 nm having a controlled light quantity is emitted from the semiconductor laser 24. The light beam emitted from the semiconductor laser 24 is converted to a collimated light by the collimating lens 25, is then transmitted through the beam state of the pit array (presence/absence of pits and pit length) at the part where the beam spot is formed. Since the difference in the reflectance reflects the state of the pit array, that is, the recording data, the return light reflected by the CD-R includes a signal component.

The return light including the signal component is transmitted through the objective lens 27, then reflected by the beam splitter 26, then condensed by the condenser lens 28, and received by the photodetector 29. The photodetector 29 has bisected light receiving sections. The photodetector 29 carries out photoelectric conversion or current-voltage conversion of the return light received by these light receiving sections, thus generating a voltage signal corresponding to the return light. The voltage signal generated by the photodetector 29 is supplied to an RF amplifier section 30.

The RF amplifier section 30 generates a reproduction signal (RF signal), a focusing error signal, a tracking error signal and a wobble signal on the basis of the voltage signal supplied from the photodetector 29 of the optical pickup 23. The reproduction signal generated by the RF amplifier section 30 is supplied to an equalizer 31. The focusing error signal and the tracking error signal are supplied to a servo control section 32. The wobble signal is supplied to an ATIP decoder 33.

The equalizer 31 performs equalizing processing with respect to the reproduction signal supplied from the RF amplifier section 30, thus carrying out waveform correction of the reproduction signal. The properties of the equalizer 31 are switched by a control section 34. As will be later described in detail, when reproducing data from the double-density CD-R, the equalizer 31 is set to have properties suitable for the double-density CD-R. The reproduction signal on which equalizing processing has been performed by the equalizer 31 is supplied to a binarizing/clock generating section 35.

The binarizing/clock generating section 35 carries out binarization processing of the reproduction signal supplied from the equalizer 31 so as to convert the reproduction signal to digital data and supplies the digital data to a data processing section 36. The binarizing/clock generating section 35 also generates a clock signal synchronized with the digital data and supplies the generated clock signal together with the digital data to the data processing section 36.

The servo control section 32 generates a control signal for carrying out focusing control and tracking control on the basis of the focusing error signal and the tracking error signal supplied from the RF amplifier section 30 and supplies the control signal to a biaxial driver 37.

The biaxial driver 37 drives a biaxial actuator, not shown, on the basis of the control signal supplied from the servo control section 32. Thus, the objective lens 27 of the optical pickup 23 held by the biaxial actuator is moved in biaxial directions, that is, in the directions toward and away from the CD-R and in the radial direction of the CD-R, thus carrying out focusing control and tracking control.

The ATIP decoder 33 under the control of the control section 34 carries out demodulation processing of the wobble signal supplied from the RF amplifier section 30, thus generating an ATIP wobble signal representing time base information. The ATIP wobble signal generated by the ATIP decoder 33 is supplied to the system control section 34. When carrying out the access operation of the optical pickup 23, the system control section 34 controls an access control section, not shown, on the basis of the ATIP wobble signal, thus causing the optical pickup 23 to access a desired recording track.

The data processing section 36 under the control of the control section 34 carries out EFM demodulation of the digital data supplied from the binarizing/clock generating section 35 and also carries out de-interleaving processing and error correction processing using a CIRC (cross interleave Reed-Solomon code). Moreover, the data processing section 36 carries out descrambling processing and error correction processing using an ECC (error correction code). Also, the data processing section 36 takes out a subcode from the EFM-demodulated data. The subcode thus taken out is supplied to the control section 34.

The data on which error correction processing has been performed by the data processing section 36 is stored into a buffer memory such as a RAM and then supplied as reproduction data to a computer or the like on the host side via an interface 38.

When recording data is supplied from the computer or the like on the host side, the data processing section 36 temporarily stores the recording data into the buffer memory such as a RAM while sequentially reading out the recording data from the buffer memory, then encodes the recording into a predetermined sector format, and adds an ECC for error correction of this recording data. Moreover, the data processing section 36 carries out CIRC encoding processing and EFM modulation processing, thus generating a write signal. The data processing section 36 supplies the write signal to a laser driver 39.

The laser driver 39 under the control of the control section 34 drives the semiconductor laser 24 of the optical pickup 23 in accordance with the write signal supplied from the data processing section 36, and causes the semiconductor laser 24 to emit a light beam modulated in accordance with the recording data. The light beam emitted from the semiconductor laser 24 is converged by the objective lens 27 and is cast onto the CD-R rotated by the spindle motor 21. Thus, a pit array corresponding to the recording data is formed on the CD-R, thus recording the recording data onto the CD-R.

The control section 34 is connected with a ROM 40, in which operation control programs for controlling the operation of the entire optical disc device 20 are stored. The control section 34 identifies whether the CD-R loaded on the spindle motor 21 is the normal-density CD-R or the double-density CD-R from the pattern of the synchronizing signal "SYNC" of the ATIP wobble signal supplied from the ATIP decoder 33, and controls the operation of the entire optical disc device 20 on the basis of the operation control program corresponding the result of identification.

Specifically, when it is determined that the CD-R loaded on the spindle motor 21 is the normal-density CD-R, the control section 34 supplies a control signal corresponding to the normal-density CD-R to the motor control section 22. On the basis of this control signal, the motor control section 22 controls driving of the spindle motor 21 so that the normal-density CD-R is rotated at a linear velocity within a range of 1.2±0.02 m/sec. On the other hand, when it is determined that the CD-R loaded on the spindle motor 21 is the double-density CD-R, the control section 34 supplies a control signal corresponding to the double-density CD-R to the motor control section 22. On the basis of this control signal, the motor control section 22 controls driving of the spindle motor 21 so that the double-density CD-R is rotated at a linear velocity within a range of 0.9±0.02 m/sec.

In the case of recording/reproducing information to/from the CD-R using the above-described optical disc device 20, information written in the PMA and the lead-in area is read first. That is, the subcodes Q of the PMA and the lead-in area are decoded and taken into the control section 34 via the data processing section 36, and on the basis of this information, the optical pickup 23 and the spindle motor 21 are controlled.

In the present invention, since identification information for identifying the subcode Q of the lead-in area on the CD-R and the subcode Q of the PMA is provided, the lead-int area and the PMA can be securely discriminated. This discrimination is carried out on the basis of the identification signal and therefore only requires a short period of time.

Although the present invention is described above using the CD-R as an example, it is a matter of course that the present invention is not limited to this.

For example, the present invention is applicable to optical discs as a whole which enable recording of information signals, like CD-RW.

As is clear from the above description, according to the optical disc of the present invention, since identification information is provided in the subcode Q of the lead-in area or the subcode Q of the program memory area, it is possible to discriminate the lead-in area and the program memory area securely and instantaneously. Also, since the PMA and the lead-in area can be discriminated not only by the address information of ATIP but also by the subcode Q, reading can be carried out more safely.

Thus, in the optical disc driving device of the present invention, identification of the lead-in area and the program memory area can be carried out on the basis of the identification signal and start-up in a short period of time is possible.

What is claimed is:

1. An optical disc comprising:
 a data area in which information signals to be recorded,
 a lead-in area provided before the data area,
 a lead-out area provided after the data area, and
 a program memory area for temporarily storing address information necessary for additionally writing information signals, wherein at least a first subcode Q of the lead-in area and/or a second subcode Q of the program memory area is/are provided with identification information that discriminates the lead-in area from the program memory area.

2. The optical disc as claimed in claim 1, wherein the identification information is provided at least in one of address (ADR), track number (TNO), and zero (ZERO) constituting the subcode Q of the lead-in area and/or the program memory area.

3. The optical disc as claimed in claim 1, wherein the identification information provided in the subcode Q of the lead-in area and/or the subcode Q of the program memory area is constituted by information of at least 2 bits.

4. The optical disc as claimed in claim 1, wherein a wobbled track groove is formed.

5. The optical disc as claimed in claim 4, wherein position information is included in wobbling information of the track groove.

6. The optical disc as claimed in claim 1, wherein the respective areas are arranged in the order of the program memory area, the lead-in area, the data area, and the lead-out area from the inner circle toward the outer circle.

7. The optical disc as claimed in claim 6, wherein a power calibration area for calibrating the laser power at the time of data recording is further provided on the inner side than the program memory area.

8. An optical disc comprising:

a data area in which a wobbled track groove is formed and information signals to be recorded, a lead-in area provided before the data area, a lead-out area provided after the data area, and a program memory area provided on the inner side than the lead-in area and adapted for temporarily storing address information necessary for additionally writing information signals, wherein at least a first subcode Q of the lead-in area and/or a second subcode Q of the program memory area is/are provided with identification information that discriminates the lead-in area from the program memory area.

9. The optical disc as claimed in claim 8, wherein the identification information is provided at least in one of address (ADR), track number (TNO), and zero (ZERO) constituting the subcode Q of the lead-in area and/or the program memory area.

10. The optical disc as claimed in claim 8, wherein the identification information provided in the subcode Q of the lead-in area and/or the subcode Q of the program memory area is constituted by information of at least 2 bits.

11. The optical disc as claimed in claim 8, wherein position information is included in wobbling information of the track groove.

12. The optical disc as claimed in claim 8, wherein a power calibration area for calibrating the laser power at the time of data recording is further provided on the inner side than the program memory area.

13. An optical disc driving device for carrying out recording and/or reproduction of information signals by casting a light beam onto an optical disc including:

a data area in which information signals to be recorded, a lead-in area provided before the data area, a lead-out area provided after the data area, and a program memory area for temporarily storing address information necessary for additionally writing information signals, the optical disc driving device comprising:

a data processing section for processing data obtained from a reflected light from the optical disc, wherein at least a first subcode Q of the lead-in area and/or a second subcode Q of the program memory area discriminate the lead-in area from the program memory area on the basis of identification information provided in the first and second subcodes.

14. The optical disc driving device as claimed in claim 13, wherein the identification information is provided at least in one of address (ADR), track number (TNO), and zero (ZERO) constituting the subcode Q of the lead-in area and/or the program memory area.

15. The optical disc driving device as claimed in claim 13, wherein the identification information provided in the subcode Q of the lead-in area and/or the subcode Q of the program memory area is constituted by information of at least 2 bits.

16. The optical disc driving device as claimed in claim 13, wherein a wobbled track groove is formed on the optical disc.

17. The optical disc driving device as claimed in claim 16, wherein position information is detected on the basis of position information included in wobbling information of the track groove.

18. The optical disc driving device as claimed in claim 13, wherein the respective areas are arranged on the optical disc in the order of the program memory area, the lead-in area, the data area, and the lead-out area from the inner circle toward the outer circle.

19. The optical disc driving device as claimed in claim 18, wherein a power calibration area for calibrating the laser power at the time of data recording is further provided on the inner side than the program memory area on the optical disc, and calibration of the laser power is carried out by using the power calibration area at the time of recording.

* * * * *